United States Patent
Korn

(10) Patent No.: US 10,018,224 B2
(45) Date of Patent: Jul. 10, 2018

(54) MACHINE STRUCTURAL MEMBER WITH NESTING LINEAR SLIDES

(71) Applicant: Edward Korn, Fitchburg, WI (US)

(72) Inventor: Edward Korn, Fitchburg, WI (US)

( * ) Notice: Subject to any disclaimer, the term of this patent is extended or adjusted under 35 U.S.C. 154(b) by 0 days.

(21) Appl. No.: 15/418,713

(22) Filed: Jan. 28, 2017

(65) Prior Publication Data
US 2018/0023623 A1    Jan. 25, 2018

Related U.S. Application Data

(60) Provisional application No. 62/365,309, filed on Jul. 21, 2016.

(51) Int. Cl.
| | |
|---|---|
| *F16C 29/02* | (2006.01) |
| *F16C 33/02* | (2006.01) |
| *B23Q 1/60* | (2006.01) |
| *F16C 29/00* | (2006.01) |

(52) U.S. Cl.
CPC ............ *F16C 29/005* (2013.01); *B23Q 1/601* (2013.01); *F16C 29/02* (2013.01); *F16C 33/02* (2013.01); *F16C 2220/00* (2013.01); *F16C 2226/00* (2013.01); *F16C 2322/39* (2013.01); *Y10T 409/302408* (2015.01)

(58) Field of Classification Search
CPC .... F16C 29/005; F16C 29/02; F16C 2220/00; F16C 2226/00; F16C 2322/39; F16C 33/02; B23Q 1/601
USPC ............ 384/7, 11, 26, 39, 42; 403/381, 384; 310/12.04, 12.02
See application file for complete search history.

(56) References Cited

U.S. PATENT DOCUMENTS

| | | | |
|---|---|---|---|
| 2,788,716 A | 4/1957 | McFerren | |
| 3,398,642 A * | 8/1968 | Grether | B23Q 35/20 409/106 |
| 3,455,191 A * | 7/1969 | Graf | B23B 29/04 82/158 |
| 3,498,685 A * | 3/1970 | Poplinski | B23Q 1/26 384/40 |

(Continued)

FOREIGN PATENT DOCUMENTS

CH             455452 A  *  7/1968  ............ B23Q 35/20

*Primary Examiner* — Marcus Charles

(57) ABSTRACT

An improved design and method is disclosed that uses a novel nesting linear slide which incorporates machine tool slides or ways into a structural member. The design simplifies the fabrication and assembly of components requiring accurate sliding alignment, such as milling machine bases, saddles, tables and columns. Due to the use of the single piece, which replaces multiple pieces in the prior art, fabrication and assembly costs are also significantly lower. The invention also enables a method of construction utilizing the novel single shape component which simplifies the assembly of machines requiring sliding surfaces with accurate alignment. The invention essentially comprises a single structural element that includes both male and female sliding members. By nesting two of the single structural elements it is possible to create sliding joints for machine tool bases, saddles, tables, and columns, as well as a wide variety of other sliding joints, in an extremely cost-effective manner. The simplicity and low cost of the method will be especially advantageous in the manufacture of small machine tools and other machines intended for higher volume production.

14 Claims, 8 Drawing Sheets

(56) References Cited

U.S. PATENT DOCUMENTS

| | | | | |
|---|---|---|---|---|
| 3,751,127 | A * | 8/1973 | Black, Jr. | A47B 47/0041 |
| | | | | 312/111 |
| 3,837,261 | A * | 9/1974 | Hoddinott | B23Q 1/28 |
| | | | | 409/241 |
| 4,030,787 | A * | 6/1977 | Brogan | B64C 3/40 |
| | | | | 384/249 |
| 4,057,294 | A * | 11/1977 | Krekeler | E02F 9/2816 |
| | | | | 175/374 |
| 4,300,271 | A * | 11/1981 | Wohlhaupter | B23Q 1/28 |
| | | | | 384/59 |
| 4,607,893 | A * | 8/1986 | Damico | F16C 29/008 |
| | | | | 384/45 |
| 5,429,438 | A | 7/1995 | Wood | |
| 5,600,188 | A * | 2/1997 | Maudal | B23Q 1/5468 |
| | | | | 310/12.04 |
| 5,845,996 | A | 12/1998 | Greubel | |
| 6,176,641 | B1 * | 1/2001 | Schenk | B23Q 1/0063 |
| | | | | 248/223.41 |
| 6,227,708 | B1 | 5/2001 | Rixen | |
| 6,485,178 | B1 * | 11/2002 | Koban | B23Q 1/58 |
| | | | | 384/39 |
| 7,371,009 | B1 * | 5/2008 | Burgess | F16C 29/02 |
| | | | | 384/39 |
| 7,811,024 | B2 * | 10/2010 | Vendetti | F41G 11/003 |
| | | | | 403/381 |
| 7,922,417 | B2 * | 4/2011 | Jimenez | A47B 47/0083 |
| | | | | 108/193 |
| 8,411,446 | B2 * | 4/2013 | Becklin | H05K 7/1421 |
| | | | | 206/594 |

* cited by examiner

MACHINE STRUCTURAL MEMBER WITH NESTING LINEAR SLIDES

BACKGROUND OF THE INVENTION

Field of the Invention

The present invention relates generally to linear slides and more specifically to machine tool ways and machine tool frames. The invention is a new and improved construction which integrates nesting linear slides into structural members. The invention enables a new method for the fabrication of machine tool components such as bases, tables, saddles, columns, or other sliding members. Due to its simplicity and extremely low cost the invention also relates to linear slides and guides for many other types of machines.

Description of the Prior Art

Ways are well known devices in the machine tool art and are used where accurate movement and positioning, high strength, and stiffness are all required to ensure precise contact of cutting or other tools with workpieces. Ways are used extensively to provide sliding alignment for various parts of machines which perform a wide variety of operations.

Dovetail ways or slides are a specific type of ways which are also well known in the machine tool art. They are used extensively in milling machines, lathes, and other machine tools. Achieving accurate alignment between dovetail ways and supporting frame members is a difficult and expensive part of machine tool manufacturing.

There exists a need, particularity in small machines, for a construction that provides strength, stiffness, and accurate alignment of machine tool ways with machine tool frames at a low cost.

Various aspects of this need have been recognized in the prior art. The prior art includes methods for attaching separately formed ways to structural members. U.S. Pat. No. 3,498,685 (Poplinski) describes a method for attaching separately formed ways to structural plates. U.S. Pat. No. 2,788,716 (McFerren) describes a machine tool frame and way construction for machine tools having opposed tool supports on aligned ways. These methods disclosed in the prior art for the mounting and positioning of ways on structural components require fastening and precise alignment of ways to structural members. This often makes their use on small or low-cost machines cost prohibitive.

U.S. Pat. No. 5,845,996 (Greubel) and U.S. Pat. No. 6,227,708 (Rixen) both describe linear guiding frames with fastening grooves or features used to attach bearings or sliding parts. U.S. Pat. No. 5,429,438 (Wood) describes a mechanical structure with sliding linear motion along an extrusion utilized in constructing a mechanical structure. The sliding linear motion is achieved through the use of a linear bearing assembly that mounts directly to the extrusion. Wood includes wear pads disposed between the linear bearing and the extrusion to prolong the life of the linear bearing and the extrusion.

The mechanical structure disclosed by Wood is not stiff enough or accurate enough to be used for most machine tool applications and many other applications where accurate guiding and positioning are required. In addition, Wood requires a separately designed support extrusion and linear bearing assembly, which increases the number of parts required to produce a sliding connection.

SUMMARY OF THE INVENTION

In view of the foregoing disadvantages inherent in the design, manufacture, and assembly of linear slides, ways and machine tool frames existing in the prior art the present invention provides an improved design and method to simply and inexpensively build machine tool frames with integrated and accurately aligned ways. The simplicity and low-cost of the design will be advantageous for many small machines, especially those used in education and by makers.

The general purpose of the present invention, which will be described subsequently in greater detail, is to provide a new and improved construction for integrating linear slides or ways into a machine frame which has all of the advantages of the prior art machines and none of the disadvantages.

To achieve this purpose the present invention essentially comprises a single piece design that includes both male and female mating linear slide components as well as a structural frame element. Utilizing the present invention a single shaped part, connected with sheet stock, can be used to form machine tool bases, saddles, tables, and columns. This enables many elements of a machine tool frame to be constructed of a component with a single shape part that is easy to mass-produce at low-cost. Many other constructions which require accurately guided sliding motion can also be fabricated using the invention.

In addition, by including in the single shape both male and female mating joint surfaces the alignment of the male and female joint surfaces with each other is built into the component. In a similar manner combining structural support from the frame element with both mating way surfaces into the single shape builds in accurate alignment of both surfaces with the frame. The invention therefore enables manufacturers to build machines at very low cost with good accuracy and extremely simple assembly.

There has thus been broadly outlined the more important features of the invention in order that the detailed description thereof that follows may be better understood, and in order that the present contribution to the art may be better appreciated. There are, of course, additional features of the invention that will be described hereinafter.

In this respect, before explaining the invention in detail, it is to be understood that the invention is not limited in its application to the details of construction and to the arrangements of the components set forth in the following description and illustrated in the drawings. The invention is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the design of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved design of linear slides, machine ways and frames which enables machines to be built with lower manufacturing and assembly costs which has all of the advantages of prior art machines and none of the disadvantages.

It is another object of the present invention to provide a method of fabrication and assembly that dramatically reduces the number of different parts required to construct linear slides such as machine tool ways and frames.

It is a further object of the present invention to provide linear slides which are accurately located with respect to the machine tool frame and to the mating slide surface by virtue of a single shape design incorporating the structural element and both male and female slide surfaces.

These objects, together with other objects of the invention, along with the various features of novelty which characterize the invention, are pointed out with particularity in the following detailed description. For a better understanding of the invention, its operating advantages, and specific objects attained by its uses, reference should be had to the accompanying drawings and descriptive material in which there is illustrated a preferred embodiment of the invention.

Further, the purpose of the abstract of this invention is to enable the US Patent and Trademark Office, the public generally, and especially scientists, engineers and practitioners in the art not familiar with patent or legal terms or phraseology to determine quickly from a cursory inspection the nature and essence of the technical disclosure of the application. The abstract is not intended to be limiting as to the scope of the invention in any way.

BRIEF DESCRIPTION OF THE DRAWINGS

The invention will be better understood when consideration is given to the following detailed description of the invention. Such description makes reference to the following drawings.

DETAILED DESCRIPTION AND BEST MODE OF IMPLEMENTATION

Figure 1:
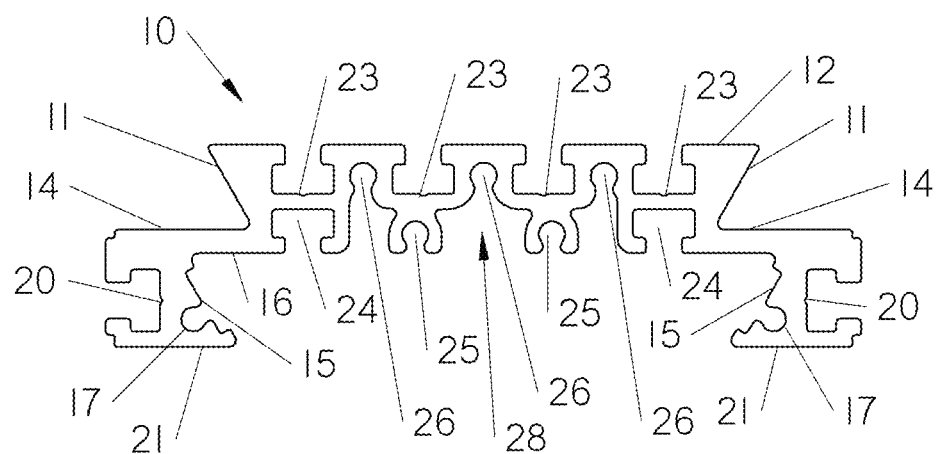
FIG. 1 is an edge view of the preferred embodiment of a nesting linear slide as utilized in the present invention.

With reference now to the drawings, wherein like numerals designate like parts, a preferred embodiment of a nesting linear slide 10 is shown in FIG. 1. Two male way surfaces 11 are located on either side of top surface 12. Two middle surfaces 14 extend out from male way surfaces 11. Two female way surfaces 15 are located on either side of base surface 16. Two pockets 17 in female way surfaces 15 are provided for fastening means. Undercut side pockets 20 are conventional tee slots provided for fastening objects to the single shape way. Two bottom surfaces 21 are located below female ways 15 and tee slots 20.

Four undercut top pockets 23 are conventional tee slots provided for fastening objects, for example workpieces, to the nesting linear slide. Two undercut bottom pockets 24 are also conventional tee slots provided for fastening objects to the nesting linear slide. Two lower pockets 25 and three upper pockets 26 are provided for fastening means. In addition, there is a space, generally indicated by 28, which provides clearance space for driving means, such as a conventional leadscrew.

Figure 2:
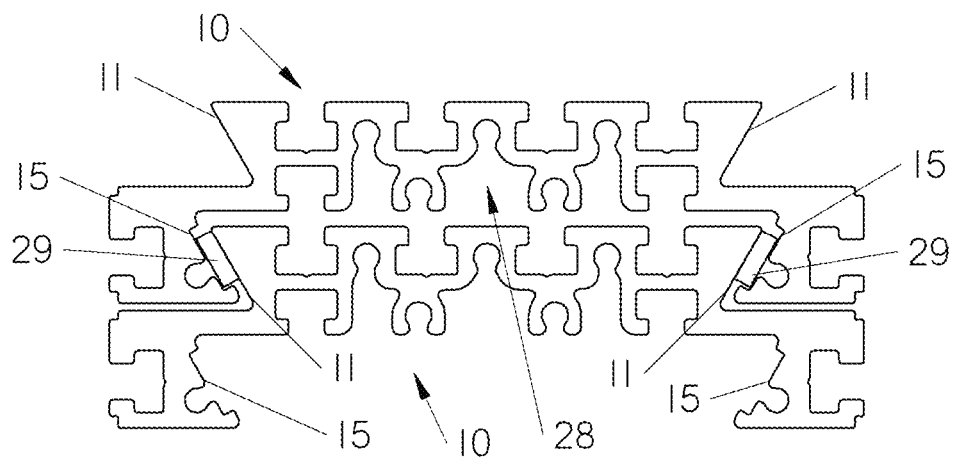
FIG. 2 is an edge view of two of the nesting linear slides shown in FIG. 1 in the nested position.

FIG. 2 shows two nesting linear slides 10 in the nested position. In the nested position a pocket is formed between the male way surfaces 11 on the lower slide and female way surfaces 15 on the upper slide. This pocket is used to contain two conventional gibs 29. Gibs 29 are commonly used in the machine tool art to provide adjustment and support between sliding surfaces. The space generally indicated by 28 provides room between upper and lower nesting linear slides 10 to locate a leadscrew or other driving mechanism.

Figure 3:
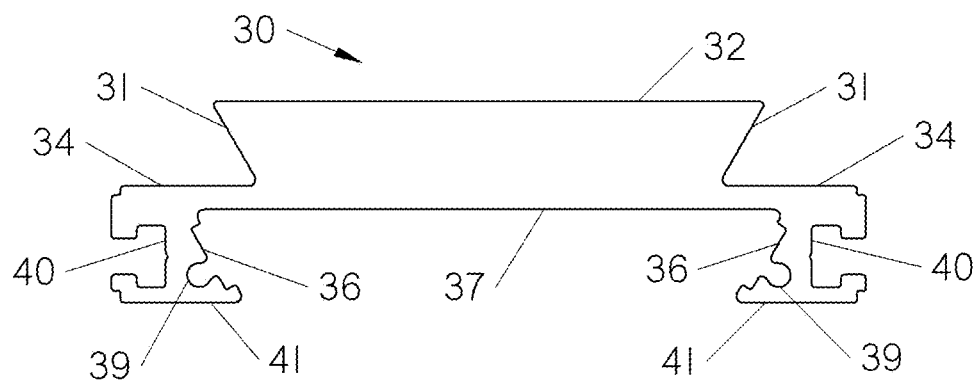
FIG. 3 is an edge view of a second more basic embodiment of a nesting linear slide.

A second, more basic, embodiment of a nesting linear slide 30 is shown in FIG. 3. Two male way surfaces 31 are located on either side of top surface 32. Two middle surfaces 34 extend out from male way surfaces 31. Two female way surfaces 36 are located on either side of base surface 37. Two pockets 39 in female way surfaces 36 are provided for fastening means. Undercut side pockets 40 are conventional tee slots provided for fastening objects to the nesting linear slide. Two bottom surfaces 41 are located below female ways 36 and tee slots 40.

Figure 4:
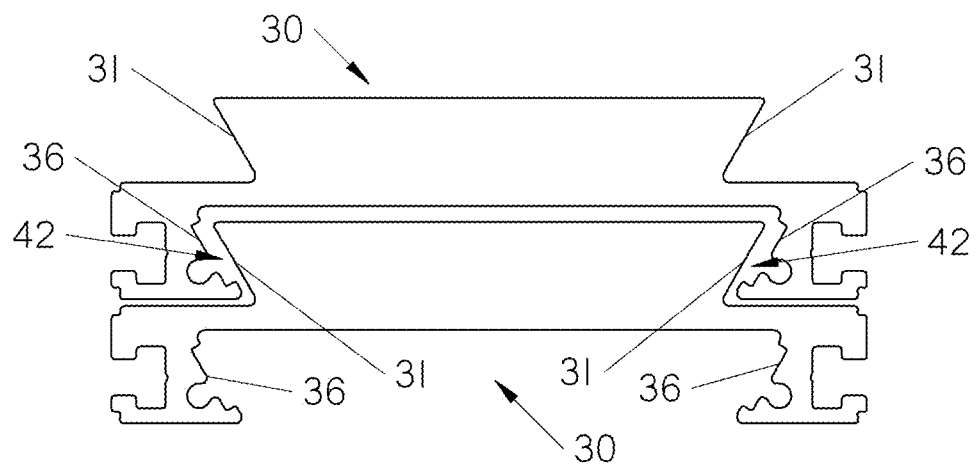
FIG. 4 is an edge view of two of the more basic nesting linear slides shown in FIG. 3 in the nested position.

FIG. 4 shows two of the basic embodiments of nesting linear slides 30 in the nested position. A pocket, generally indicated by 42 is formed between male way surfaces 31 and female way surfaces 36.

Figure 5:
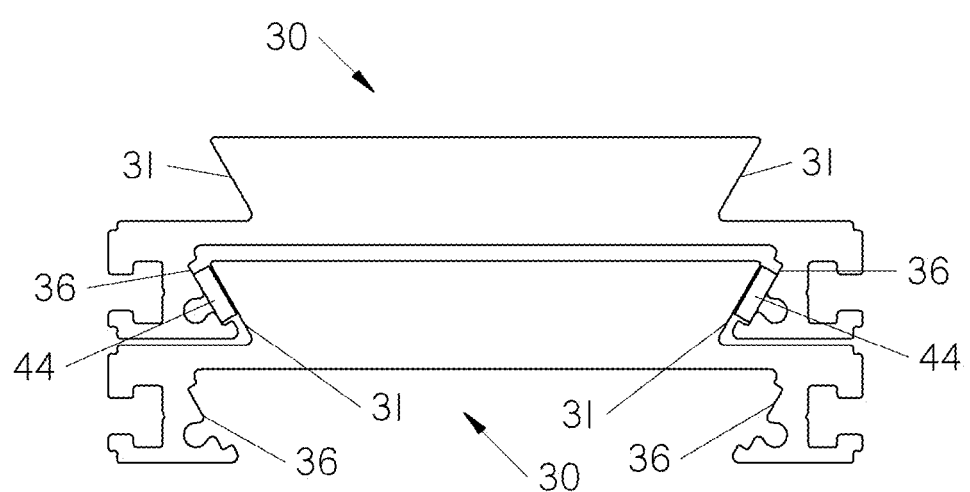
FIG. 5 is an edge view of two of the nesting linear slides shown in FIG. 3 in the nested position which includes two gibs.

In FIG. 5 two of the basic embodiments of nesting linear slides 30 are shown with two conventional gibs 44 located in the pockets formed between male way surfaces 31 and female way surfaces 36.

Figure 6:
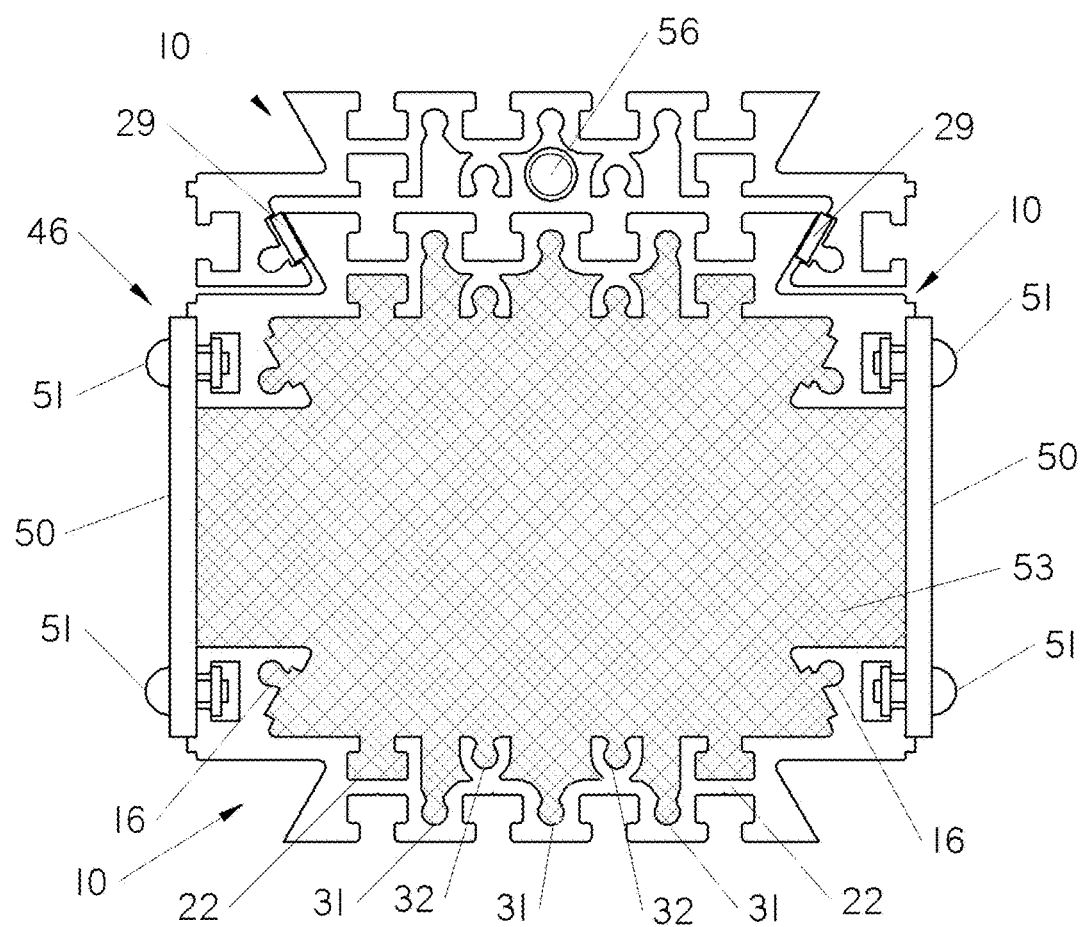
FIG. 6 is an edge view of an assembly utilizing three of the preferred embodiment nesting linear slides shown in FIG. 1.

A more rigid structure 46 is shown in FIG. 6 where two nesting linear slides 10 are connected by side plates 50 using fastening means 51. The interior of the structure is then filled with cement or other material as indicated by 53 to create a structure that is stronger and more resistant to bending, deflection and vibration. In this configuration the pockets 16, 31, and 32 and tee slots 22 on the inner sides of the two fastened linear slides 10, which are normally used for fastening objects to the linear slides, serve an additional purpose of helping to lock the linear slides firmly in connection with the fill material 53.

A top nesting linear slide 10 is shown nested above rigid structure 46. The top nesting linear slide 10 in this configuration could serve as, for example, a machine tool table, the bottom of a machine tool saddle, or to support the headstock on a machine tool column. A traditional driving means, for example a leadscrew, is shown at 56. Two conventional gibs 29 serve to align and support top nesting linear slide 10 with respect to rigid structure 46. All three nesting linear slides 10 are of identical shape and could be cut, for example, from a single piece of extruded or machined stock.

Figure 7:
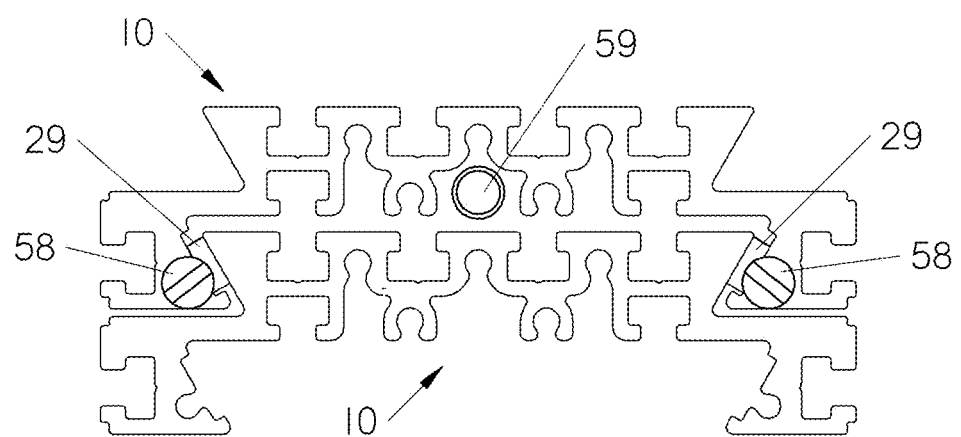
FIG. 7 is an edge view of the preferred embodiment of two nesting linear slides showing gibs, gib fastening means and the end of a leadscrew.

FIG. 7 shows two nesting linear slides 10 in the nested position. Two conventional gibs 29 are shown between the nesting linear slides. The gibs are held in place by conventional fastening means 58. A conventional leadscrew 59 is also shown in FIG. 7 between the upper and lower nesting linear slides.

In the prior art separate slide and support parts typically are designed and fabricated for the upper and lower ways to build a construction such as the one shown in FIG. 7. Using the present invention this is no longer necessary, as one single part, cut to different lengths as needed, is all that is required.

Often separate slide components would be mounted to structural components adding to the complexity, cost, difficulty of assembly, and difficulty of alignment during machine tool manufacturing. Using the present invention a single shape is used to build the entire sliding way structure. The single shape design and method can be used in many parts of machine tools. It can therefore be manufactured in high-volume at a much lower cost than several differently shaped pieces. This is especially important for small machines which may be intended for broad markets such as education, hobbyists, and makers.

Figure 8:
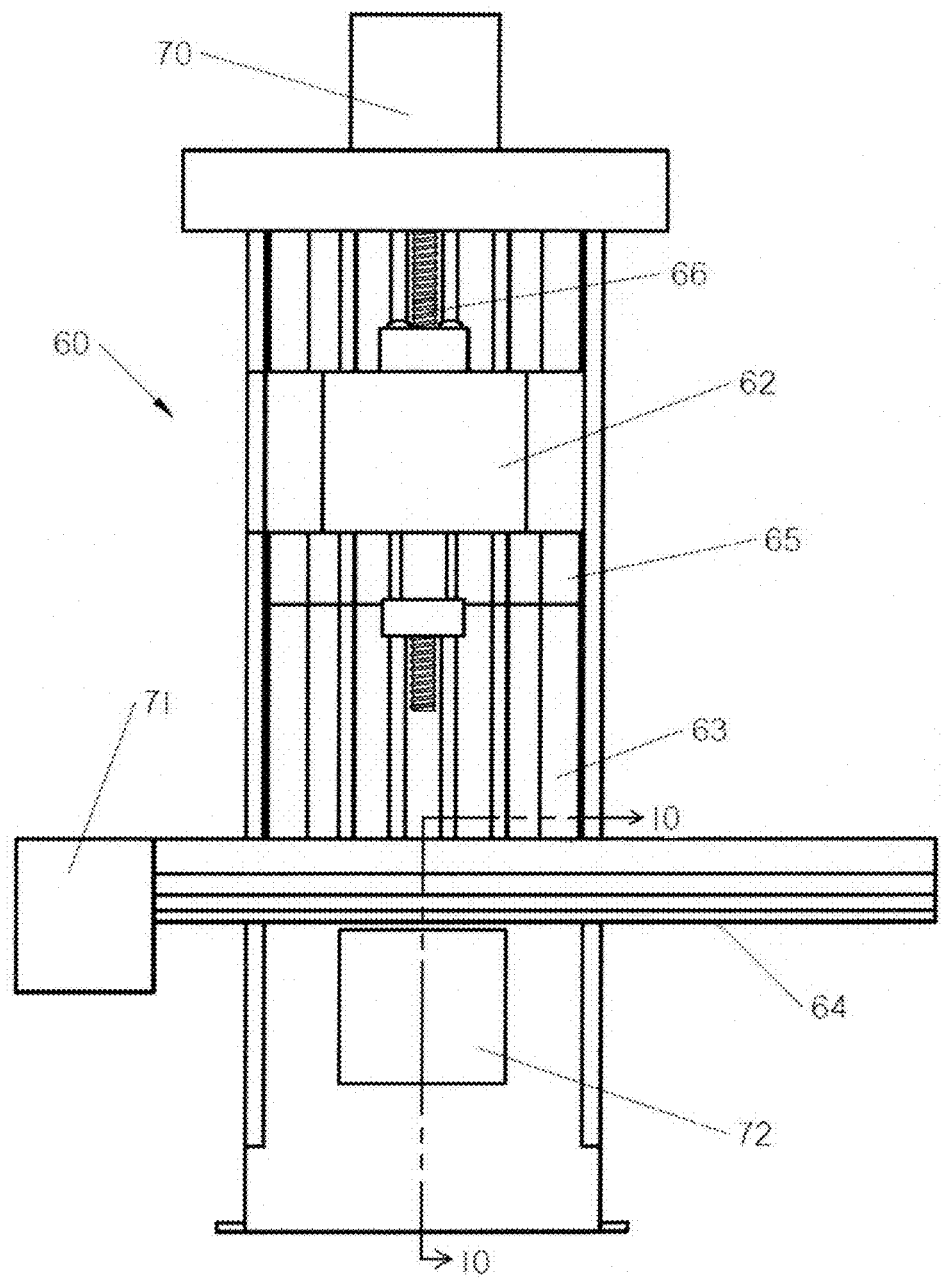
FIG. 8 is a front view of a milling machine constructed using nesting linear slides as structural and sliding components.

FIG. 8 shows a front view of a small milling machine 60 made using the nesting linear slides of the present invention. The table 64 is made of one piece of nesting linear slide. The column 63 is made using another piece of nesting linear slide. The spindle head 62 is mounted to yet another piece of nesting linear slide 65. Vertical motion of spindle head 62 is accomplished by conventional lead screw 66 and driving means 70 and nesting linear slides 63 and 65 provide support and allow slidable movement in the Z-axis direction. Conventional driving means 71 for the X-axis and 72 for the Y-axis are also shown.

Figure 9:
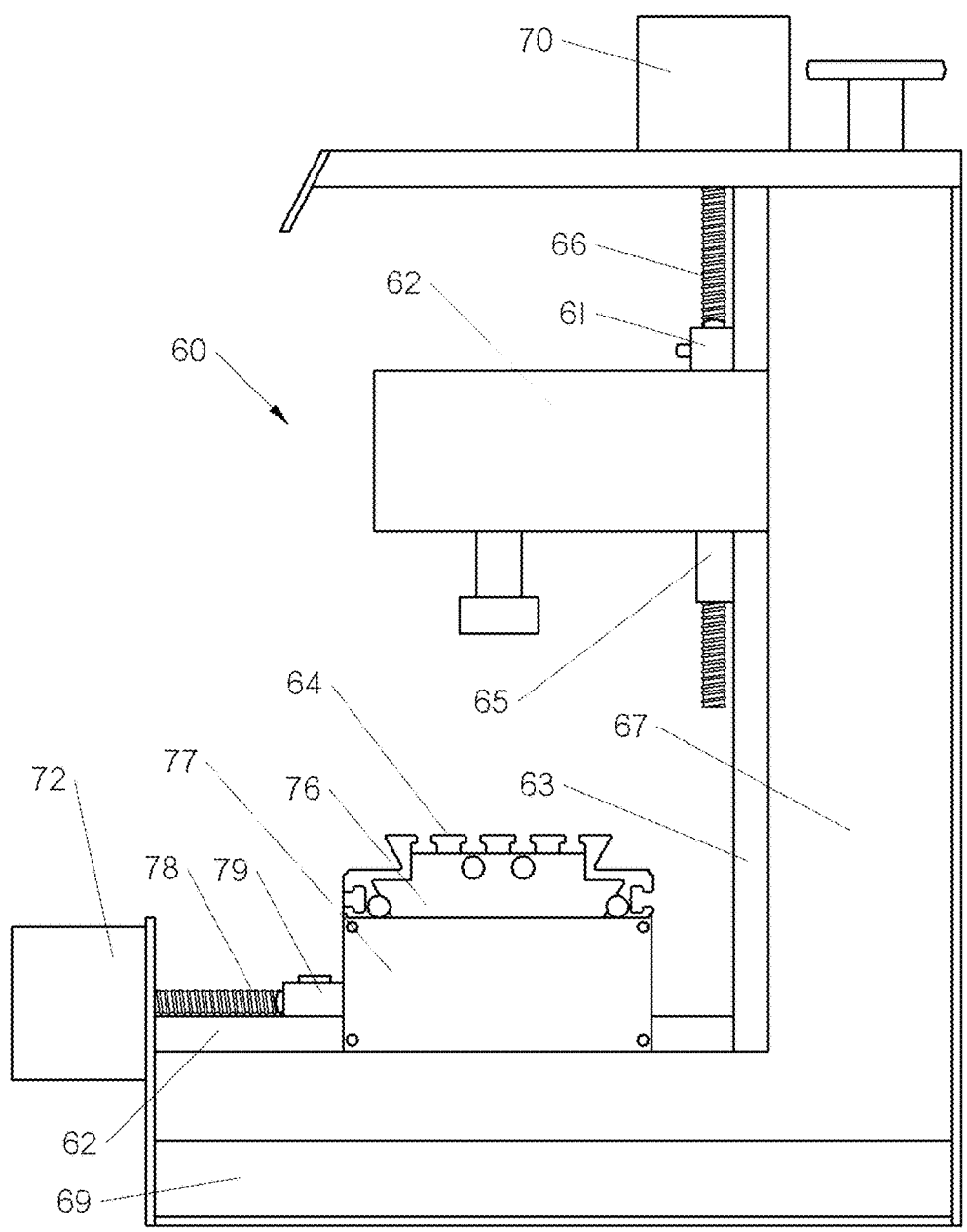
FIG. 9 is a right side view of a milling machine constructed using nesting linear slides as structural and sliding components

A right side view of the milling machine 60 is shown in FIG. 9. One piece of nesting linear slide 62 is used in the base, another piece of nesting linear slide forms the machine table 64. The end of table 64 is covered with a cover plate 76. A different piece of nesting linear slide 63 forms part of the column and yet another nesting linear slide piece 65 supports spindle head 62. Sheet stock shown at 67 and 69 is attached to the nesting linear slides 62 and 63 with conventional fastening means to form the basic structure of the milling machine. The machine saddle 77 is formed of two pieces of nesting linear slide fastened together by a cover plate. Conventional leadscrew 66, ball nut 61, and driving means 70 provide motion for the Z-axis and conventional leadscrew 78, ball nut 79, and driving means 72 provide motion for the Y-axis.

Figure 10:
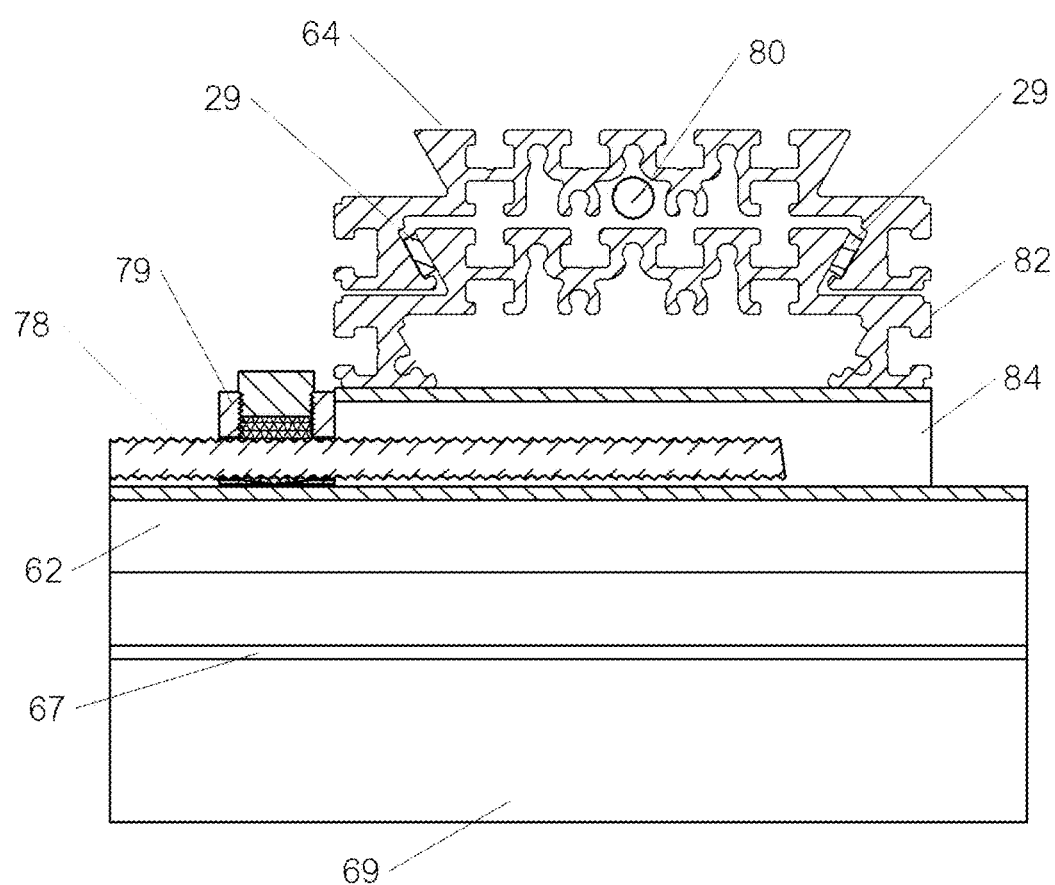
FIG. 10 is a partial cross-section view at section 10-10 in FIG. 8 of a milling machine constructed using nesting linear slides as structural and sliding components.

A partial cross-section view of the milling machine 60 is shown in FIG. 10. Y-axis driving means 72 and the machine column are removed for clarity. One piece of nesting linear slide 64 is used as the table. Another piece of nesting linear slide 82 forms the top of the machine saddle. Conventional gibs 29 are shown between nesting linear slide 64 and nesting linear slide 82. A different piece of nesting linear slide 84, which is fastened orthogonally to nesting linear slide piece 82, forms the bottom of the saddle.

Nesting linear slide piece 62 forms part of the machine tool base and supports the saddle by nesting with piece 84. Sheet stock shown at 67 and 69 is attached to the nesting linear slide 62 with conventional fastening means to form the base structure of the milling machine. Conventional leadscrew 78 and ball nut 79 provide motion for the Y-axis. Conventional leadscrew 80 provides motion for the X-axis.

The key feature of the present invention is the inclusion of both male and female sliding elements into a single piece design which also provides structural support. This single piece can therefore be used to make both male and female surfaces for slidable connections, such as ways, that are integrated into a structural frame element. The invention provides a method to make sliding joints, which are used extensively in machine tool design and fabrication, in an inexpensive and easy to assemble manner.

The present invention can be readily made using an extrusion or various other machining processes. Care and precision can be taken during the setup of equipment to make the nesting linear slide because larger volumes of material will be processed. This makes it possible to produce parts with improved accuracy at lower costs.

Another important feature of the present invention is that it enables a method of machine tool construction utilizing common elements which greatly reduces the parts count and assembly time required to fabricate machine tools. By fastening the nesting linear slide pieces of the present invention to simple sheet stock material complete machine tool frames can be fabricated and assembled from a minimal number of parts.

It can readily be seen that the invention is characterized by simplicity and economy of construction. By incorporating the present invention into the design of a machine requiring sliding elements the machine can be fabricated with greatly reduced cost and acceptable accuracy.

The advantages of the invention should now be readily apparent to those skilled in the art without the necessity for a more detailed description of the elements. With respect to the above description it is to be understood that the optimal dimensional relationships for the parts of the invention, to include variations in size, materials, shape, form, function and manner of operation, assembly, and use, are deemed readily apparent and obvious to one skilled in the art. All equivalent relationships to those illustrated in the drawings and described in the specification are intended to be encompassed by the present invention.

Therefore, the foregoing is to be considered as only illustrative of the principles of the invention. Since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A linear slide comprising a pair of male slide surfaces and a pair of female slide surfaces wherein said pair of male slide surfaces and said pair of female slide surfaces are formed such that a first length of said linear slide and a second length of said linear slide with the same cross section can be adapted to cooperate in a nested fashion wherein said pair of male slide surfaces of said first length of said linear slide is guided by and moveable relative to said pair of female slide surfaces of said second length of said linear slide in a rectilinear path, including machine tool gib plates disposed between said male slide surfaces and said female slide surfaces when said male slide surfaces and said female slide surfaces are adapted to cooperate in said nested fashion.

2. The linear slide of claim 1 wherein said pair of male slide surfaces and said pair of female slide surfaces are machine ways.

3. The linear slide of claim 2 including means for fastening objects to said linear slide.

4. The linear slide of claim 1 wherein said pair of male slide surfaces and said pair of female slide surfaces are dovetail machine tool ways.

5. The linear slide of claim 4 including means for fastening objects to said linear slide.

6. The linear slide of claim 1 including means for fastening objects to said linear slide.

7. A method of forming a sliding joint comprising the steps of:

forming a linear slide comprising a pair of male slide surfaces and a pair of female slide surfaces wherein said pair of male slide surfaces and said pair of female slide surfaces are formed such that a first length of said linear slide and a second length of said linear slide with the same cross section can be adapted to cooperate in a nested fashion wherein said pair of male slide surfaces of said first length of said linear slide is guided by and moveable relative to said pair of female slide surfaces of said second length of said linear slide in a rectilinear path;

arraigning said first length of said linear slide and said second length of said linear slide in a nested fashion wherein said pair of male slide surfaces of said first length of said linear slide is guided by and moveable relative to said pair of female slide surfaces of said second length of said linear slide in a rectilinear path;

including machine tool gib plates disposed between said male slide surfaces and said female slide surfaces when said male slide surfaces and said female slide surfaces are adapted to cooperate in said nested fashion.

8. The method of claim 7 wherein said pair of male slide surfaces and said pair of female slide surfaces are dovetail machine tool ways.

9. The method of claim 8 wherein said first length of said linear slide forms part of a machine tool base and said second, nested, length of said linear slide forms part of a machine tool saddle.

10. The method of claim 8 wherein said first length of said linear slide forms part of a machine tool saddle and said second, nested, length of said linear slide forms part of a machine tool table.

11. The method of claim 8 wherein said first length of said linear slide forms part of a machine tool column and said second, nested, length of said linear slide supports a machine tool headstock.

12. A method of forming a machine saddle comprising the steps of:

forming a linear slide comprising a pair of male slide surfaces and a pair of female slide surfaces wherein said pair of male slide surfaces and said pair of female slide surfaces are formed such that a first length of said linear slide and a second length of said linear slide with the same cross section can be adapted to cooperate in a nested fashion wherein said pair of male slide surfaces of said first length of said linear slide is guided by and moveable relative to said pair of female slide surfaces of said second length of said linear slide in a rectilinear path;

including means for fastening objects to said linear slide in said linear slide;

arraigning said first length and said second length of said linear slide in an orthogonal fashion wherein said pairs of male and female slide surfaces on said first length of said linear slide are at right angles to said pairs of male and female slide surfaces on said second length of said linear slide;

fastening said first length and said second length of said linear slide together using fastening means to form a single structure wherein said pairs of male and female slide surfaces of said first length of said linear slide are at right angles to said pairs of male and female slide surfaces of said second length of said linear slide.

13. The method of claim 12 wherein said pair of male slide surfaces and said pair of female slide surfaces are machine ways.

14. The method of claim 13 wherein said pair of male slide surfaces and said pair of female slide surfaces are dovetail machine tool ways.

* * * * *